US008737381B1

(12) United States Patent
Croak et al.

(10) Patent No.: US 8,737,381 B1
(45) Date of Patent: May 27, 2014

(54) METHOD AND APPARATUS FOR ENABLING THE RECEIPT OF PHONE CALLS BEHIND A NETWORK ADDRESS TRANSLATION DEVICE

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1549 days.

(21) Appl. No.: 11/253,455

(22) Filed: Oct. 19, 2005

(51) Int. Cl.
*H04L 12/66* (2006.01)

(52) U.S. Cl.
USPC .......................................................... 370/352

(58) Field of Classification Search
USPC .................... 370/282, 352, 401; 709/229, 245
See application file for complete search history.

(56) References Cited

U.S. PATENT DOCUMENTS

| | | | | |
|---|---|---|---|---|
| 7,082,133 | B1* | 7/2006 | Lor et al. | 370/392 |
| 2001/0043608 | A1* | 11/2001 | Potter et al. | 370/401 |
| 2003/0018912 | A1* | 1/2003 | Boyle et al. | 713/201 |
| 2003/0093563 | A1* | 5/2003 | Young et al. | 709/245 |
| 2003/0227903 | A1* | 12/2003 | Watson | 370/352 |
| 2004/0255035 | A1* | 12/2004 | Klaghofer et al. | 709/229 |
| 2005/0141482 | A1* | 6/2005 | Kleiner | 370/352 |
| 2005/0201304 | A1* | 9/2005 | Olshansky | 370/282 |
| 2005/0243803 | A1* | 11/2005 | Fang | 370/352 |
| 2011/0010752 | A1* | 1/2011 | Hunyady et al. | 726/1 |

\* cited by examiner

*Primary Examiner* — Sonia Gay

(57) ABSTRACT

A method and apparatus for enabling users behind NAT devices to receive unsolicited VoIP calls by allowing the VoIP network to dynamically open a temporary tunnel between the users' VoIP endpoint and the VoIP network for the subscriber to receive call set up messages and media streams from other callers are disclosed. An unsolicited call is a call that can be originated from any calling party endpoint. Once the call is finished, the temporary tunnel will be closed.

6 Claims, 4 Drawing Sheets

METHOD AND APPARATUS FOR ENABLING THE RECEIPT OF PHONE CALLS BEHIND A NETWORK ADDRESS TRANSLATION DEVICE

The present invention relates generally to communication networks and, more particularly, to a method and apparatus for enabling the receipt of phone calls behind network address translation devices in communication networks, e.g., packet networks such as Voice over Internet Protocol (VoIP) networks.

BACKGROUND OF THE INVENTION

Subscribers of packet network services, e.g., VoIP network services are increasingly using premise based Network Address Translation (NAT) devices, such as a NAT router, to allow them to share a single public IP address among multiple networked devices. In addition to mapping multiple private IP addresses into a single public IP address, these NAT devices protect premise-based equipment from public attacks from the Internet by blocking uninitiated communication requests to the subscriber from the public Internet. Unfortunately this extra layer of security sometimes prevents subscribers using these NAT devices from receiving VoIP calls. NAT is a method that converts the IP address from a private address to a public address. This allows multiple end point devices to share a single public IP address. It also prevents access to these end point devices from the public Internet without special configurations. NAT is used in home networks and corporations to allow multiple PCs to access the internet via Digital Subscriber Loop (DSL) or Cable Modem.

Therefore, a need exists for a method and apparatus for enabling the receipt of phone calls behind Network Address Translation devices in a packet network, e.g., a VoIP network.

SUMMARY OF THE INVENTION

In one embodiment, the present invention enables users behind NAT devices to receive unsolicited VoIP calls by allowing the VoIP network to dynamically open a temporary tunnel between the users' VoIP endpoint and the VoIP network for the subscriber to receive call set up messages and media streams from other callers. An unsolicited call is a call that can be originated from any calling party endpoint. Once the call is finished, the temporary tunnel will be closed.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
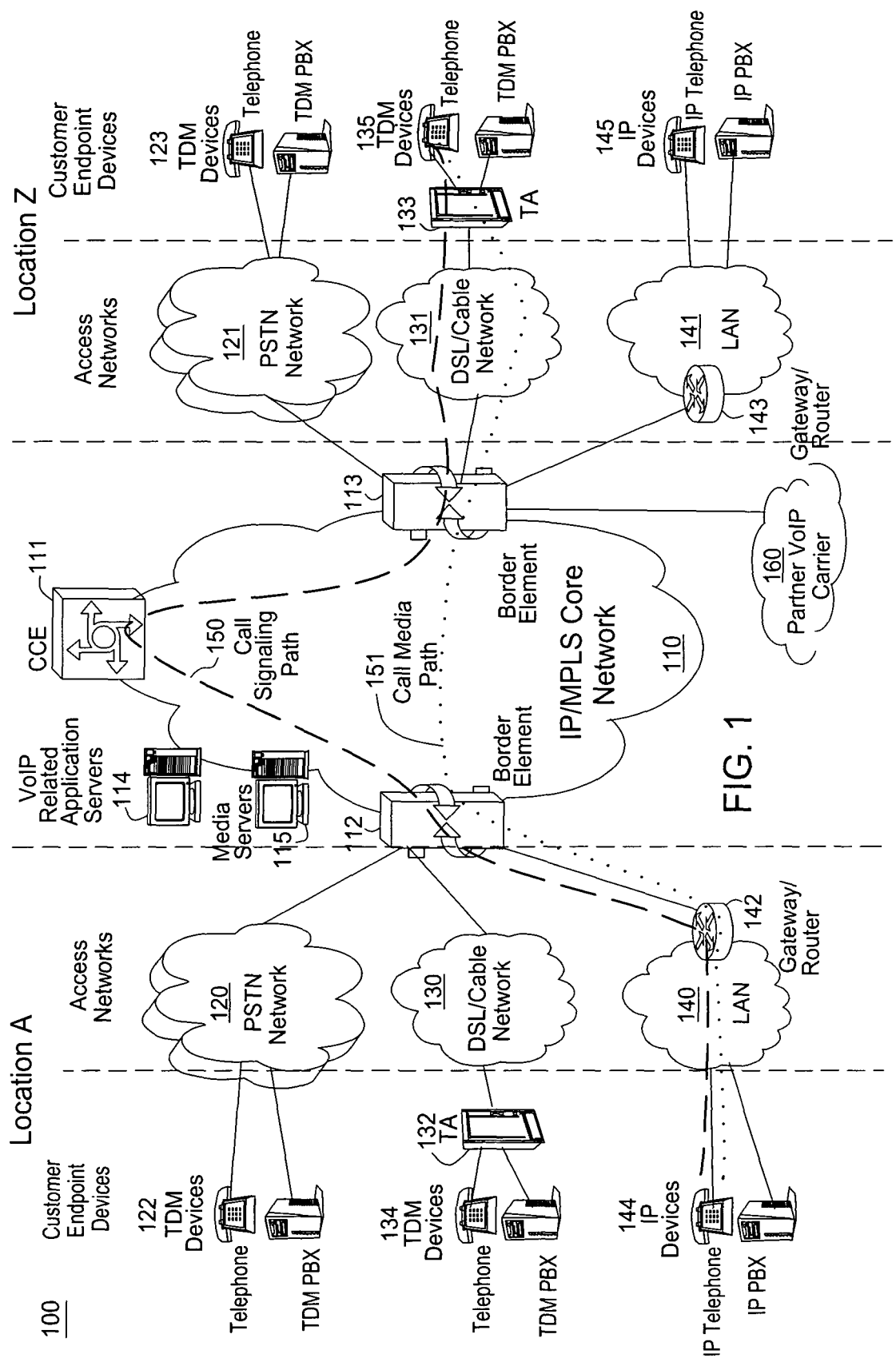
FIG. 1 illustrates an exemplary Voice over Internet Protocol (VoIP) network related to the present invention.

To better understand the present invention, FIG. 1 illustrates an example network 100, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Subscribers of packet network services, e.g., VoIP network services are increasingly using premise based Network Address Translation (NAT) devices, such as a NAT router, to allow them to share a single public IP address among multiple networked devices. In addition to mapping multiple private IP addresses into a single public IP address, these NAT devices protect premise-based equipment from public attacks from the Internet by blocking uninitiated communication requests to the subscriber from the public Internet. Unfortunately this extra layer of security sometimes prevents subscribers using these NAT devices from receiving VoIP calls. NAT is a method that converts the IP address from a private address to a public address. This allows multiple end point devices to share a single public IP address. It also prevents access to these end point devices from the public Internet without special configurations. NAT is used in home networks and corporations to allow multiple PCs to access the internet via Digital Subscriber Loop (DSL) or Cable Modem.

To address this criticality, the present invention enables users behind NAT devices to receive unsolicited VoIP calls by allowing the VoIP network to dynamically open a temporary tunnel between the users' VoIP endpoint and the VoIP network for the subscriber to receive call set up messages and media streams from other callers. An unsolicited call is a call that can be originated from any calling party endpoint. Once the call is finished, the temporary tunnel will be closed.

Figure 2:
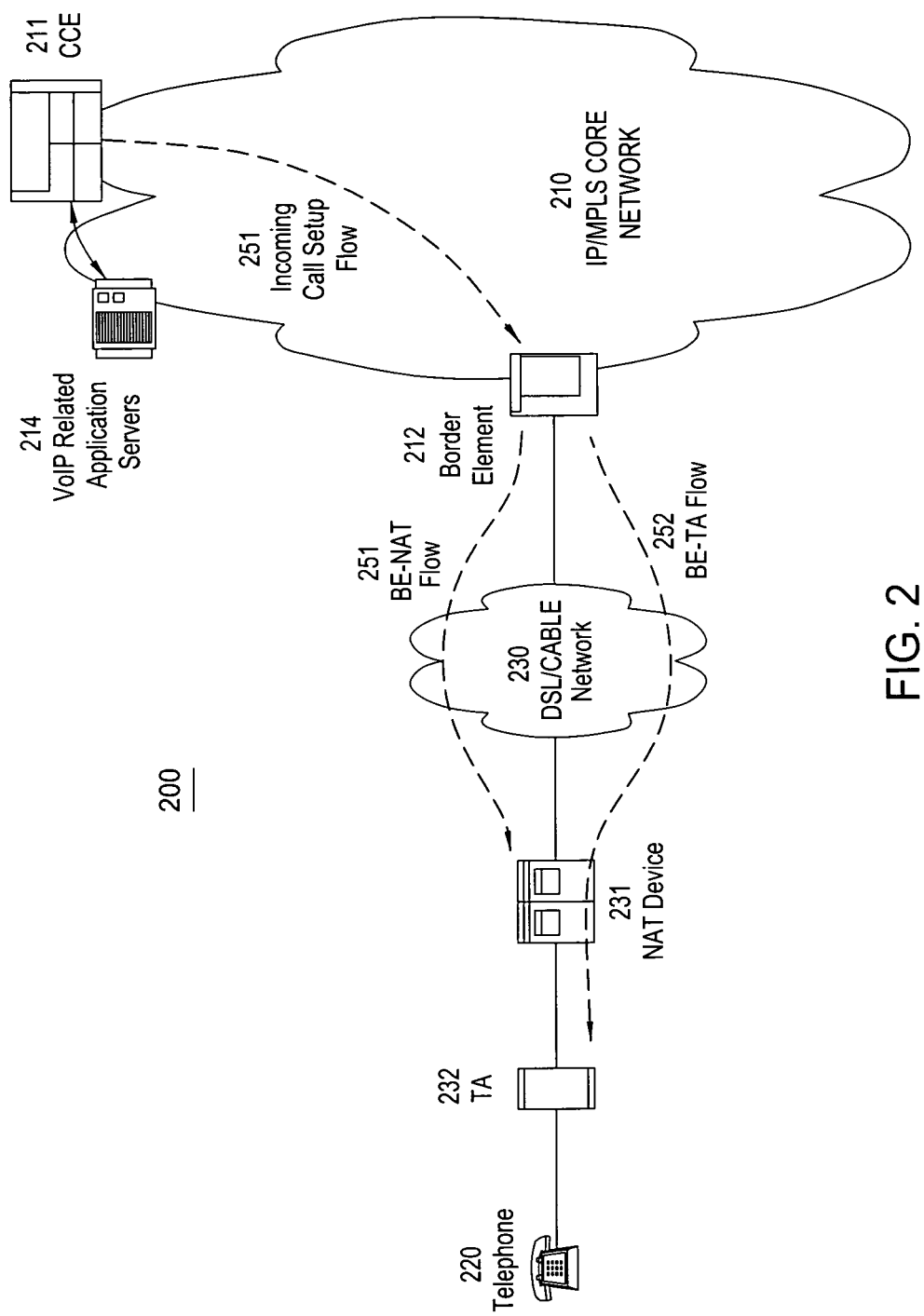
FIG. 2 illustrates an example of enabling the receipt of phone calls behind NAT devices related to the present invention.

FIG. 2 illustrates an exemplary communication architecture 200 for enabling the receipt of phone calls behind NAT devices related to the present invention. In FIG. 2, a subscriber installs a NAT router 231 between the VoIP endpoint device, TA 232, and the edge component of the VoIP network, BE 212. NAT device 231 may block incoming VoIP calls due to its default configurations. For example, an incoming call setup message destined to the subscriber 220 is sent by CCE 211 to BE 212 using signaling flow 250. BE 212 is the edge component of the VoIP network 210 that connects to the subscriber VoIP endpoint device, TA 232 via access network 230. Upon receiving the incoming call setup message destined to TA 232, BE 212 sends a message to NAT device 231, using BE to NAT flow 251, to open up a tunnel that will allow the incoming call setup message to tunnel through NAT device 231 to reach TA 232. In one embodiment, BE 212 opens up a particular Transmission Control Protocol (TCP) or User Datagram Protocol (UDP) port in NAT device 231 to allow incoming VoIP calls. Once the tunnel is opened, the incoming call setup message is forwarded by BE 212 to TA 232 using flow 252 to complete the call setup procedures to establish a call between the subscriber and a caller. When the call is finished, BE 212 sends another message to NAT device 231, using BE to NAT flow 251, to close the established tunnel that will prevent incoming call setup message to pass through NAT device 231. In one embodiment, BE 212 closes a previously opened Transmission Control Protocol (TCP) or User Datagram Protocol (UDP) port in NAT device 231 to prevent incoming VoIP calls.

Figure 3:
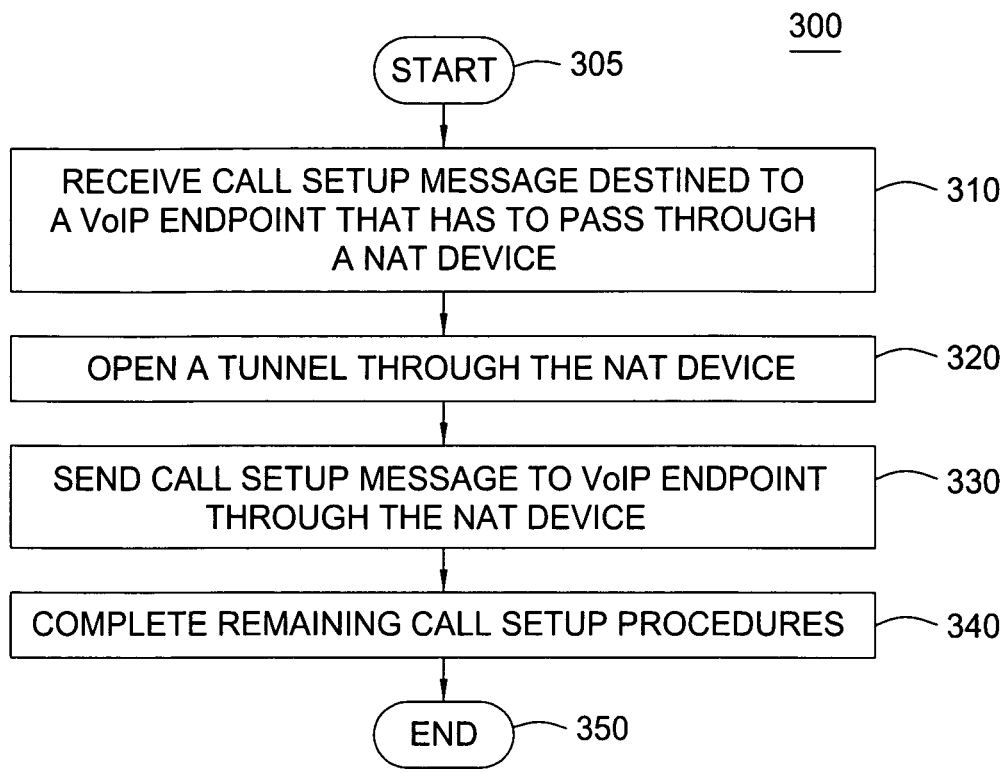
FIG. 3 illustrates a flowchart of a method for opening a tunnel through NAT devices of the present invention.

FIG. 3 illustrates a flowchart of a method 300 for opening a tunnel through NAT devices of the present invention. Method 300 starts in step 305 and proceeds to step 310.

In step 310, the method receives a call setup message destined to a VoIP endpoint device that has a NAT device installed between the endpoint device and a packet network, e.g., a VoIP network. The NAT device is blocking all incoming call signaling messages.

In step 320, the method communicates with the NAT device to open a tunnel that will allow incoming call signaling messages to pass through the NAT device. For example, the BE sends a command to the NAT device to open the tunnel. In one embodiment, the BE opens up a particular Transmission Control Protocol (TCP) or User Datagram Protocol (UDP) port in the NAT device to allow incoming VoIP calls.

In step 330, the method sends the incoming call setup message to the destined VoIP endpoint device passing through the NAT device. In step 340, the method completes the remaining call setup procedures to establish the incoming call. The method ends in step 350.

Figure 4:
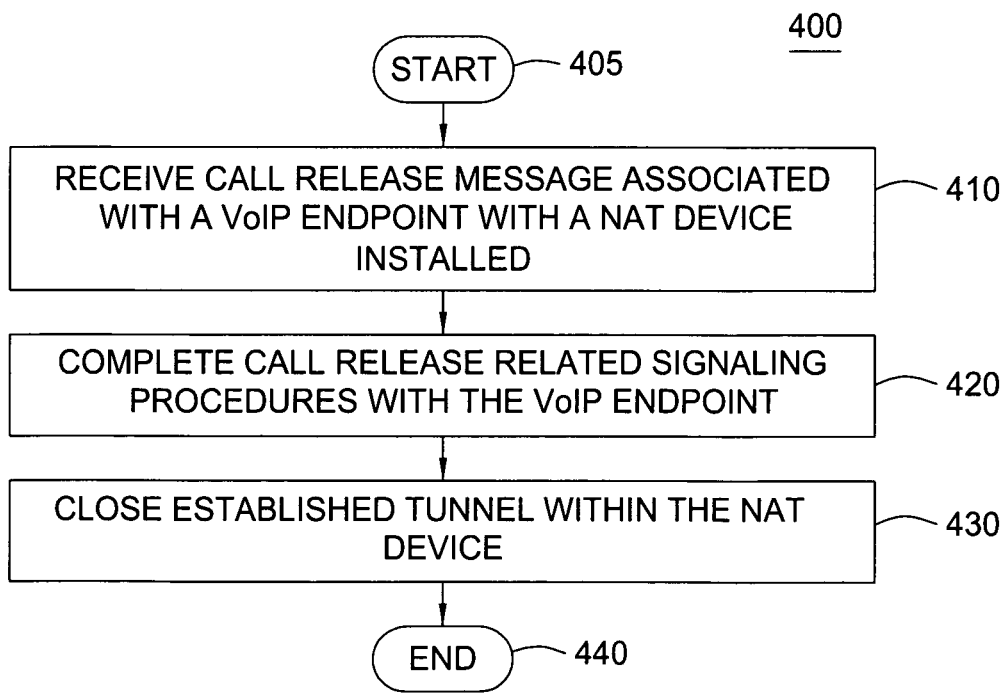
FIG. 4 illustrates a flowchart of a method for closing an established tunnel through NAT devices of the present invention.

FIG. 4 illustrates a flowchart of a method 400 for closing an established tunnel through NAT devices of the present invention. Method 400 starts in step 405 and proceeds to step 410.

In step 410, the method receives a call release message to tear down a call associated with a VoIP endpoint device that has a NAT device installed between the endpoint device and the VoIP network. In step 420, the method completes the call release signaling procedures to tear down the call associated with the endpoint device. In step 430, the method communicates with the NAT device to close the previously established tunnel that allows call signaling messages to pass through to the endpoint device. In one embodiment, the BE closes a previously opened Transmission Control Protocol (TCP) or User Datagram Protocol (UDP) port in the NAT device to prevent further incoming VoIP calls. The method ends in step 440.

Figure 5:
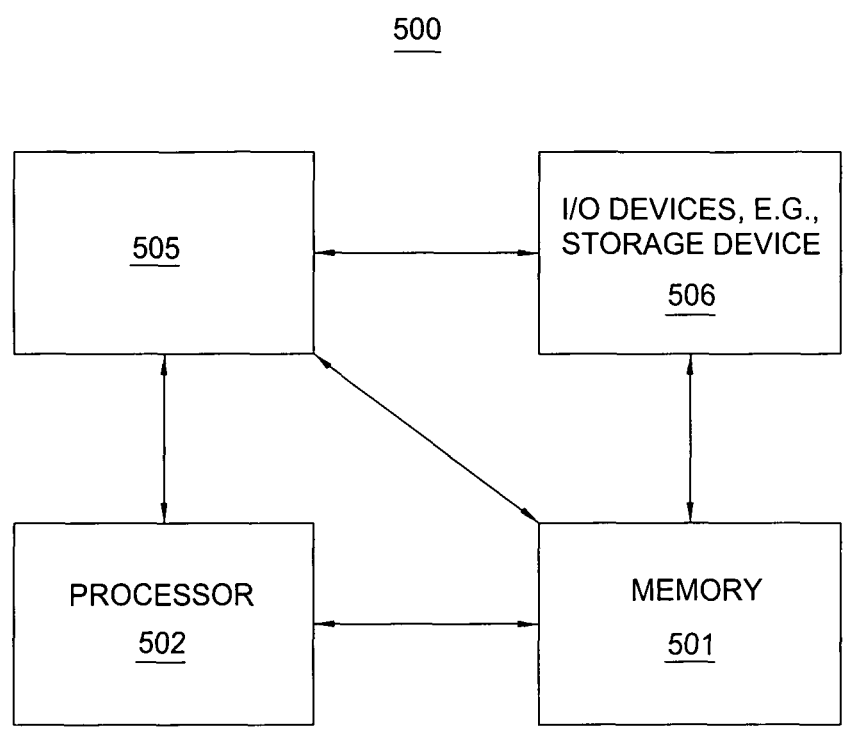
FIG. 5 illustrates a high level block diagram of a general purpose computer suitable for use in performing the functions described herein.

FIG. 5 depicts a high level block diagram 500 of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for enabling the receipt of phone calls behind Network Address Translation devices, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for enabling the receipt of phone calls behind Network Address Translation devices can be loaded into memory 504 and executed by processor 502 to implement the functions as discussed above. As such, the present process 505 for enabling the receipt of phone calls behind Network Address Translation devices (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling receipt of a call behind a network address translation device, comprising:
   receiving an incoming call setup message destined to an endpoint situated behind the network address translation device, wherein the incoming call setup message is received by a border element in a service provider communication network that is in communication with the endpoint via the network address translation device, wherein the network address translation device is deployed at a customer premises that is distinct from the service provider communication network, wherein the customer premises comprises a home network;
   establishing, by the border element, dynamically a tunnel on the network address translation device to allow the incoming call setup message to reach the endpoint, wherein the establishing comprises:
      sending a first command by the border element to the network address translation device to open the tunnel through a particular port on the network address translation device, wherein the particular port comprises a user datagram protocol port on the network address translation device; and
      sending the call setup message from the border element to the endpoint via the tunnel through the particular port on the network address translation device to complete the call, wherein the call comprises a voice over internet protocol call;
   receiving, by the border element, a call release message to tear down the call when the call is finished; and
   closing, by the border element, the tunnel on the network address translation device when the call is finished, wherein the closing the tunnel comprises sending a second command by the border element to the network address translation device to close the tunnel through the particular port on the network address translation device, wherein the network address translation device blocks all incoming voice over internet protocol calls except the voice over Internet protocol call that is established via the tunnel on the network address translation device by the border element in the service provider network.

2. The method of claim 1, wherein the service provider communication network is an internet protocol network.

3. A non-transitory computer-readable medium storing a plurality of instructions which, when executed by a processor of a border element, cause the processor to perform operations for enabling receipt of a call behind a network address translation device, the operations comprising:
   receiving an incoming call setup message destined to an endpoint situated behind the network address translation device, wherein the incoming call setup message is received by the border element in a service provider communication network that is in communication with the endpoint via the network address translation device, wherein the network address translation device is deployed at a customer premises that is distinct from the service provider communication network, wherein the customer premises comprises a home network;
   establishing dynamically a tunnel on the network address translation device to allow the incoming call setup message to reach the endpoint, wherein the establishing comprises:
      sending a first command by the border element to the network address translation device to open the tunnel through a particular port on the network address translation device, wherein the particular port comprises a user datagram protocol port on the network address translation device; and
      sending the call setup message from the border element to the endpoint via the tunnel through the particular port on the network address translation device to complete the call, wherein the call comprises a voice over internet protocol call;
   receiving, by the border element, a call release message to tear down the call when the call is finished; and closing, by the border element, the tunnel on the network address translation device when the call is finished, wherein the closing the tunnel comprises sending a second command by the border element to the network address translation device to close the tunnel through the particular port on the network address translation device, wherein the network address translation device blocks all incoming voice over Internet protocol calls except the voice over internet protocol call that is established via the tunnel on the network address translation device by the border element in the service provider network.

4. The non-transitory computer-readable medium of claim 3, wherein the service provider communication network is an internet protocol network.

5. An apparatus for enabling receipt of a call behind a network address translation device, comprising:
  a processor of a border element; and
  a computer-readable medium storing a plurality of instructions which, when executed by the processor, cause the processor to perform operations, the operations comprising:
    receiving an incoming call setup message destined to an endpoint situated behind the network address translation device, wherein the incoming call setup message is received by the border element in a service provider communication network that is in communication with the endpoint via the network address translation device, wherein the network address translation device is deployed at a customer premises that is distinct from the service provider communication network, wherein the customer premises comprises a home network;
    establishing dynamically a tunnel on the network address translation device to allow the incoming call setup message to reach the endpoint, wherein the establishing comprises:
      sending a first command by the border element to the network address translation device to open the tunnel through a particular port on the network address translation device, wherein the particular port comprises a user datagram protocol port on the network address translation device; and
      sending the call setup message from the border element to the endpoint via the tunnel through the particular port on the network address translation device to complete the call, wherein the call comprises a voice over internet protocol call;
    receiving, by the border element, a call release message to tear down the call when the call is finished; and
    closing, by the border element, the tunnel on the network address translation device when the call is finished, wherein the closing the tunnel comprises sending a second command by the border element to the network address translation device to close the tunnel through the particular port on the network address translation device, wherein the network address translation device blocks all incoming voice over internet protocol calls except the voice over internet protocol call that is established via the tunnel on the network address translation device by the border element in the service provider network.

6. The apparatus of claim 5, wherein the service provider communication network is an internet protocol network.

* * * * *